United States Patent
Kim et al.

(10) Patent No.: US 10,793,159 B2
(45) Date of Patent: Oct. 6, 2020

(54) APPARATUS FOR PROVIDING MAP INFORMATION FOR DETERMINING DRIVING SITUATION OF VEHICLE, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Jun Soo Kim, Seoul (KR); Joo Hyun Ryu, Seoul (KR); Tae Sung Choi, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 233 days.

(21) Appl. No.: 15/823,237

(22) Filed: Nov. 27, 2017

(65) Prior Publication Data
US 2019/0126930 A1    May 2, 2019

(30) Foreign Application Priority Data
Oct. 27, 2017   (KR) .......................... 10-2017-0140772

(51) Int. Cl.
| | | |
|---|---|---|
| B60W 40/06 | (2012.01) | |
| B60W 40/04 | (2006.01) | |
| B60W 30/095 | (2012.01) | |
| G01C 21/32 | (2006.01) | |
| G01C 21/34 | (2006.01) | |
| B60W 50/00 | (2006.01) | |

(52) U.S. Cl.
CPC .......... *B60W 40/06* (2013.01); *B60W 30/095* (2013.01); *B60W 40/04* (2013.01); *G01C 21/32* (2013.01); *B60W 2050/0005* (2013.01); *G01C 21/34* (2013.01)

(58) Field of Classification Search
CPC ......... B60W 40/06; B60W 2050/0005; B60W 40/04; B60W 30/095; G01C 21/34
See application file for complete search history.

(56) References Cited

U.S. PATENT DOCUMENTS

| | | | | |
|---|---|---|---|---|
| 2013/0173114 A1* | 7/2013 | Pillai | ..................... | B60W 30/16 701/41 |
| 2015/0142304 A1* | 5/2015 | Nishibashi | ......... | G01C 21/3629 701/430 |

(Continued)

FOREIGN PATENT DOCUMENTS

| | | |
|---|---|---|
| JP | 2014-0052341 A | 3/2014 |
| JP | 2017-0090301 A | 5/2017 |

(Continued)

*Primary Examiner* — Basil T. Jos
(74) *Attorney, Agent, or Firm* — Morgan, Lewis & Bockius LLP

(57) ABSTRACT

An apparatus for providing map information for determining a driving situation of a vehicle includes a processor configured to update a position of an own vehicle to a detailed map including lane information, configure a valid detailed map by selecting an effective region around the position of the own vehicle on the basis of the position of the own vehicle on the detailed map, and generate a road model according to a requested type of a vehicle device which has requested providing of map information, using the valid detailed map.

15 Claims, 23 Drawing Sheets

(56) References Cited

U.S. PATENT DOCUMENTS

| | | |
|---|---|---|
| 2017/0059716 A1 | 3/2017 | Choi et al. |
| 2017/0122749 A1 | 5/2017 | Urano et al. |
| 2018/0157262 A1* | 6/2018 | Ao .................. G05D 1/0212 |

FOREIGN PATENT DOCUMENTS

| | | |
|---|---|---|
| JP | 2017-0097088 A | 6/2017 |
| KR | 10-2012-0067228 A | 6/2012 |
| KR | 10-2017-0027389 A | 3/2017 |
| KR | 10-2017-0052488 A | 5/2017 |
| KR | 10-2017-0068021 A | 6/2017 |
| KR | 10-2017-0070725 A | 6/2017 |

* cited by examiner

APPARATUS FOR PROVIDING MAP
INFORMATION FOR DETERMINING
DRIVING SITUATION OF VEHICLE,
SYSTEM INCLUDING THE SAME, AND
METHOD THEREOF

CROSS-REFERENCE TO RELATED
APPLICATION

This application is based on and claims the benefit of priority to Korean Patent Application No. 10-2017-0140772, filed on Oct. 27, 2017, in the Korean Intellectual Property Office, the entire disclosure of which is incorporated herein by reference.

TECHNICAL FIELD

The present disclosure relates to an apparatus for providing map information for determining a driving situation of a vehicle, a system including the same, and a method thereof, and more particularly, to a technique of forming map information fitting types requested by vehicle devices and providing the map information.

BACKGROUND

Recently, various driving assistance systems for driver convenience and safety have been developed. For example, driving assistance systems which recognize a nearby vehicle through sensors installed in vehicles and assist driving convenience of drivers, such as a highway driving assist (HDA), a blind-spot collision avoidance assist (BCA), an advanced driver assistance system (ADAS), and the like, have continuously been developed.

Unlike a driver's visual field, sensors used in these driving assistance systems measure only a distance to a moving object and a speed of the moving object, there is a limitation in determining a behavior of a vehicle according to a road situation such as driving on a winding road (or a curved road), or the like. When a driving situation is determined using only information of sensors measuring a relative speed of an own vehicle and a distance, the driving situation may be erroneously determined according to a road shape such as a winding road, or the like.

SUMMARY

The present disclosure has been made to solve the above-mentioned problems occurring in the prior art while advantages achieved by the prior art are maintained intact.

An aspect of the present disclosure provides an apparatus for providing map information for determining a driving situation of a vehicle, capable of forming map information of a specific position fitting types requested by vehicle devices and providing the corresponding map information, whereby map information may be simply and conveniently provided by simply processing data of a required part without having to process a huge amount of data, a system including the same, and a method thereof.

Technical subjects obtainable from the present disclosure are non-limited by the above-mentioned technical task. And, other unmentioned technical tasks can be clearly understood from the following description by those having ordinary skill in the technical field to which the present disclosure pertains.

According to an exemplary embodiment of the present disclosure, an apparatus for providing map information includes a processor configured to: update a position of an own vehicle to a detailed map including lane information; configure a valid detailed map by selecting an effective region around the position of the own vehicle on the basis of the position of the own vehicle on the detailed map; and generate a road model according to a requested type of a vehicle device which has requested providing of map information, using the valid detailed map.

The processor may receive information regarding the position of the own vehicle from a vehicle sensor or a precise location determining device.

The detailed map may include a link representing a road, a node connecting the link to a link, and a lane link representing a lane in which a vehicle drives.

The processor may map the position of the own vehicle to the lane link to display the position of the own vehicle.

The processor may select the effective region on the basis of the number or a distance of higher links positioned in front of the own vehicle, the number or a distance of lower links positioned behind the own vehicle, and the number or a distance of sub-links at a point where links meet, on the basis of the position of the own vehicle on the detailed map.

The processor may select a region within a predetermined distance or within a predetermined number of links based on the position of the own vehicle, as the effective region.

The processor may generate a lane link of a road on which the own vehicle drives, within the predetermined distance or within the predetermined number of links based on the position of the own vehicle, and generate the road model in which the position of the own vehicle is displayed on the lane link where the own vehicle is positioned and a local reference route representing a driving route of the own vehicle is displayed.

The processor may generate a lane link of a road on which the own vehicle drives, within the predetermined distance or within the predetermined number of links based on the position of the own vehicle, and generate a road model by generating the road model coordinates system for determining a neighboring vehicle on the basis of the lane link in which the own vehicle is positioned.

According to another exemplary embodiment of the present disclosure, an apparatus for providing map information includes: a detailed map database (DB) storing a detailed map including road shape information configured in a plurality of lane links; and a map information providing apparatus comprising a processor configured to map a position of an own vehicle to the detailed map, select an effective region around the position of the own vehicle on the basis of the position of the own vehicle, generate a road model according to a requested type of a vehicle device which has requested providing of map information within the effective region, and provide the generated road model to the vehicle device.

The map information providing apparatus may further include: a communication device communicatively connected to the processor and configured to perform communication with the vehicle device.

The processor may be further configured to: update the position of the own vehicle to the detailed map including lane information; configure a valid detailed map by selecting the effective region around the position of the own vehicle on the basis of the position of the own vehicle on the detailed map; and generate the road model according to the requested type of the vehicle device which has requested the providing of map information, using the valid detailed map.

The detailed map may include a link representing a road, a node connecting the link to a link, and a lane link representing a lane in which a vehicle drives, and the processor may map the position of the own vehicle to the lane link to display the position of the own vehicle.

The processor may select the effective region on the basis of the number or a distance of higher links positioned in front of the own vehicle, the number or a distance of lower links positioned behind the own vehicle, and the number or a distance of sub-links at a point where links meet, on the basis of the position of the own vehicle on the detailed map.

The processor may select a region within a predetermined distance or within a predetermined number of links based on the position of the own vehicle, as the effective region.

The processor may generate a lane link of a road on which the own vehicle drives, within the predetermined distance or within the predetermined number of links based on the position of the own vehicle, and generate the road model in which the position of the own vehicle is displayed on the lane link where the own vehicle is positioned and a local reference route representing a driving route of the own vehicle is displayed.

The processor may generate a lane link of a road on which the own vehicle drives, within the predetermined distance or within the predetermined number of links based on the position of the own vehicle, and generate the road model by generating a road model coordinates system for determining a neighboring vehicle on the basis of the lane link in which the own vehicle is positioned.

According to another exemplary embodiment of the present disclosure, a method for providing map information includes steps of: updating, by a processor, a position of an own vehicle to a detailed map including lane information; configuring, by the processor, a valid detailed map by selecting an effective region around the position of the own vehicle on the basis of the position of the own vehicle on the detailed map; and generating, by the processor, a road model according to a requested type of a vehicle device which has requested providing of map information, using the valid detailed map.

In the step of configuring a valid detailed map, the effective region may be selected on the basis of the number or a distance of higher links positioned in front of the own vehicle, the number or a distance of lower links positioned behind the own vehicle, and the number or a distance of sub-links at a point where links meet, on the basis of the position of the own vehicle on the detailed map.

In the step of generating a road model, a lane link of a road on which the own vehicle drives may be generated within a predetermined distance or within a predetermined number of links based on the position of the own vehicle, and a road model in which the position of the own vehicle is displayed on the lane link where the own vehicle is positioned and a local reference route representing a driving route of the own vehicle is displayed may be generated.

In the step of generating a road model, a lane link of a road on which the own vehicle drives may be generated within a predetermined distance or within a predetermined number of links based on the position of the own vehicle, and a road model may be generated by generating a road model coordinates system for determining a neighboring vehicle on the basis of the lane link in which the own vehicle is positioned.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
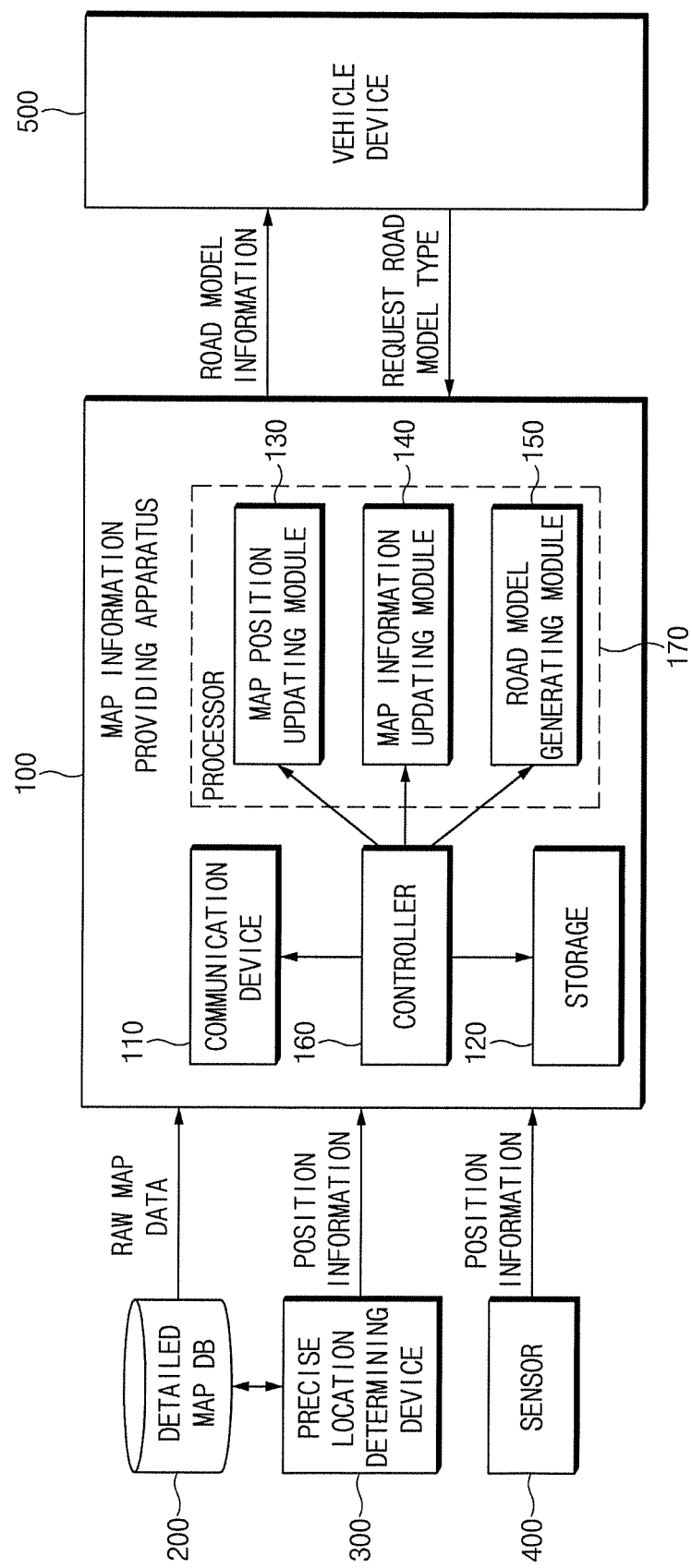
FIG. 1 is a block diagram of a system for providing map information for determining a driving situation of a vehicle according to an exemplary embodiment of the present disclosure.

Hereinafter, exemplary embodiments of the present disclosure will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms. Unless indicated otherwise, it is to be understood that all the terms used in the specification, including technical and scientific terms have the same meaning as those that are understood by those skilled in the art to which the present disclosure pertains. It must be understood that the terms defined by the dictionary are identical with the meanings within the context of the related art, and they should not be ideally or excessively formally defined unless the context clearly dictates otherwise.

Hereinafter, exemplary embodiments of the present disclosure will be described in detail with reference to FIGS. 1 to 16.

Figure 2:
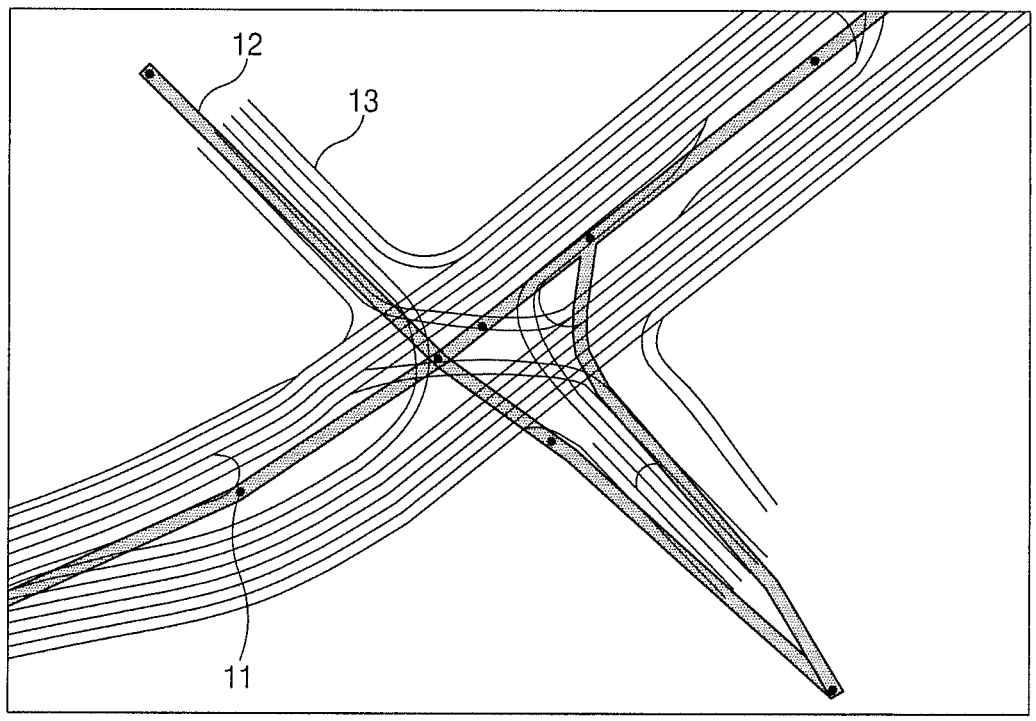
FIG. 2 is a view illustrating a road shape of a detailed map according to an exemplary embodiment of the present disclosure.
Figure 3:
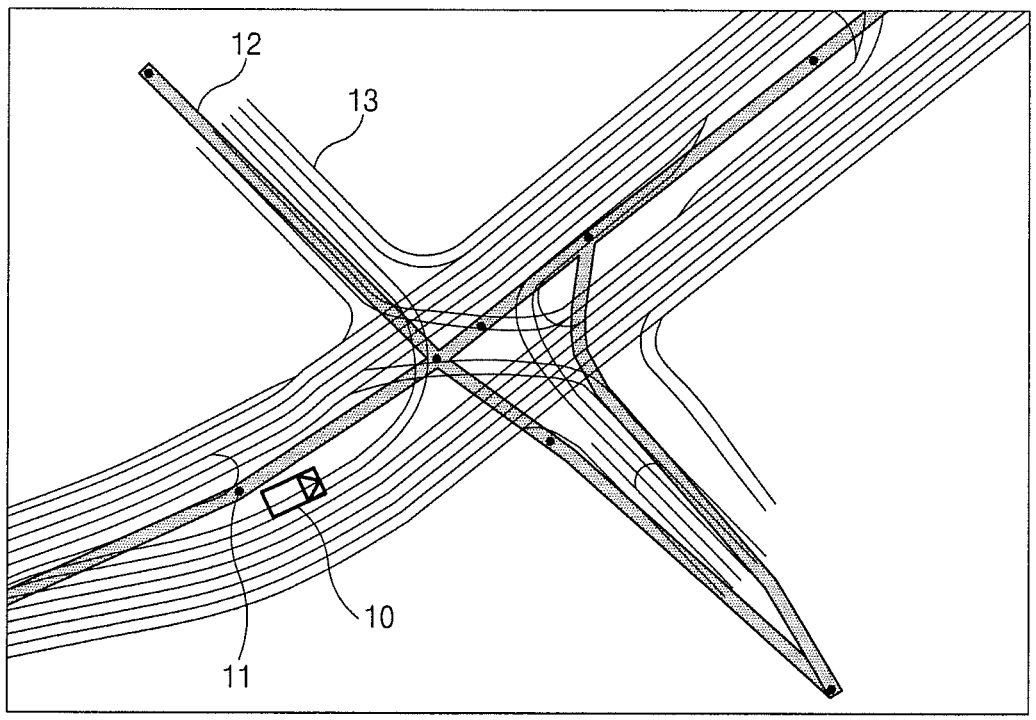
FIG. 3 is a view illustrating that a position of an own vehicle is mapped to a road shape of the detailed map of FIG. 2.
Figure 4:
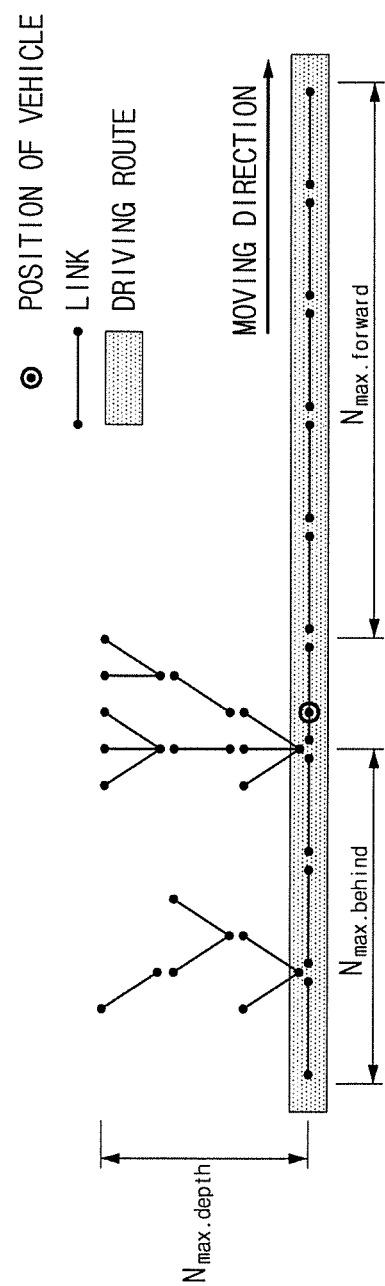
FIG. 4 is a view illustrating that a link effective region on the basis of a position of an own vehicle is selected and displayed according to an exemplary embodiment of the present disclosure.
Figure 5A:
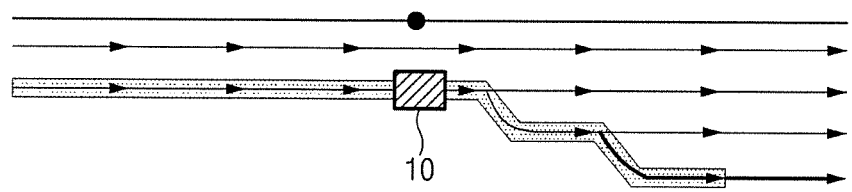
FIG. 5A is a view illustrating a road model generated according to a requested type of a vehicle device according to an exemplary embodiment of the present disclosure.
Figure 5B:
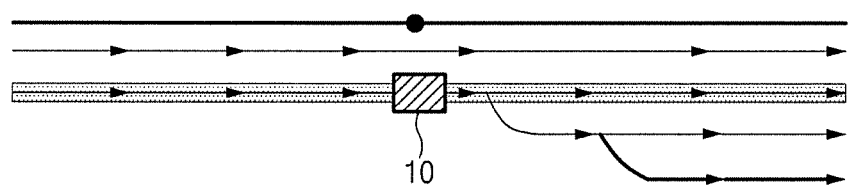
FIG. 5B is a view illustrating a road model representing a coordinates system of an own vehicle driving road according to a requested type of a vehicle device according to another exemplary embodiment of the present disclosure.
Figure 5C:
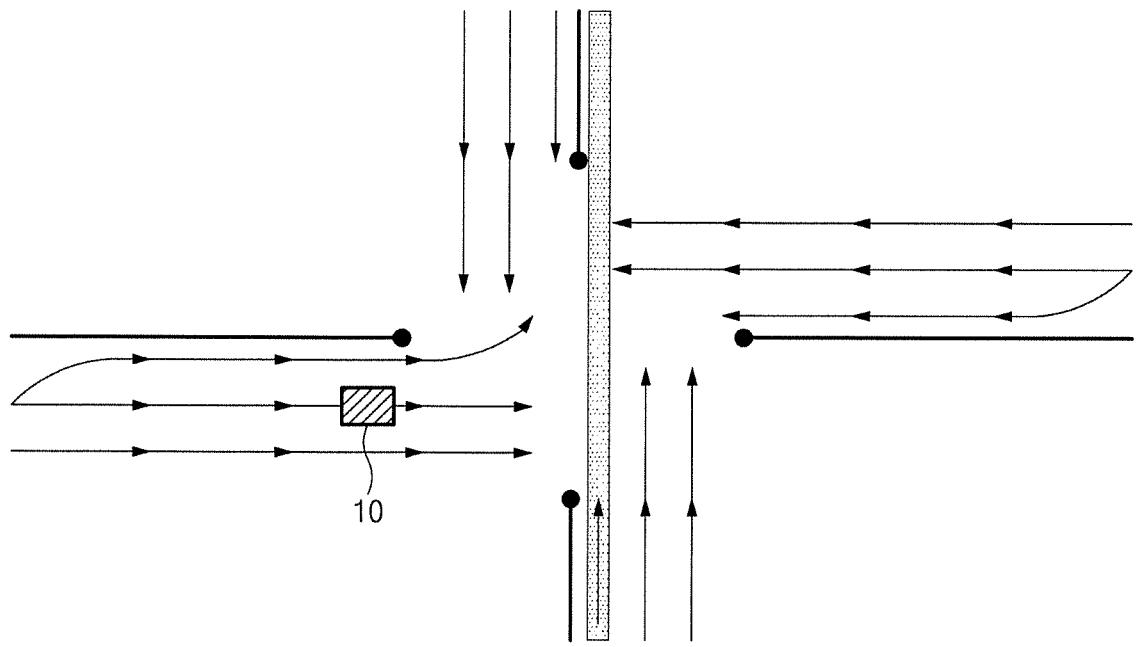
FIG. 5C is a view illustrating a road model representing a coordinates system of a driving route of a target vehicle according to a requested type of a vehicle device according to an exemplary embodiment of the present disclosure.
Figure 5D:
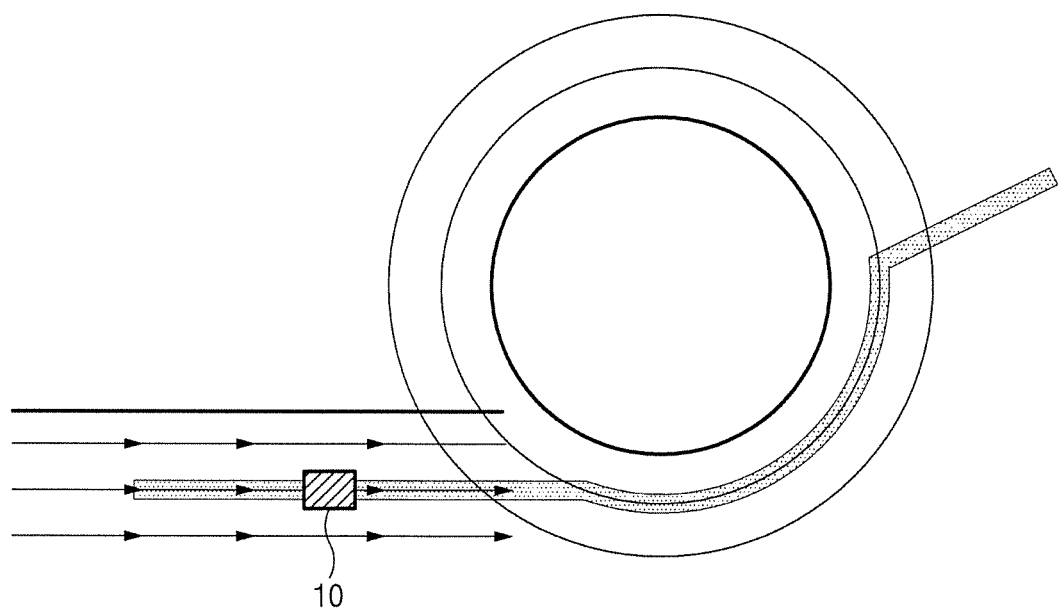
FIG. 5D is a view illustrating a road model representing a coordinates system when a vehicle takes the rotary according to a requested type of a vehicle device according to an exemplary embodiment of the present disclosure.
Figure 6A:
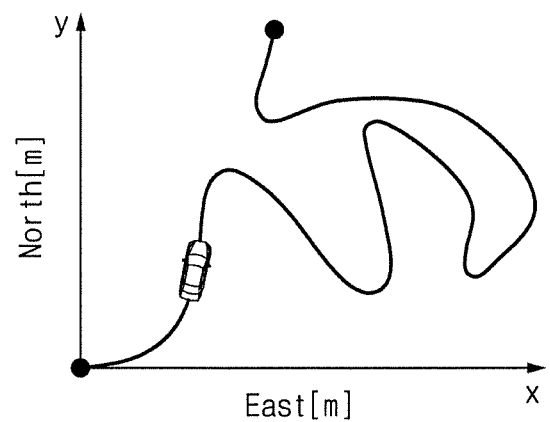
FIG. 6A is a view illustrating the Cartesian coordinates system according to an exemplary embodiment of the present disclosure.
Figure 6B:
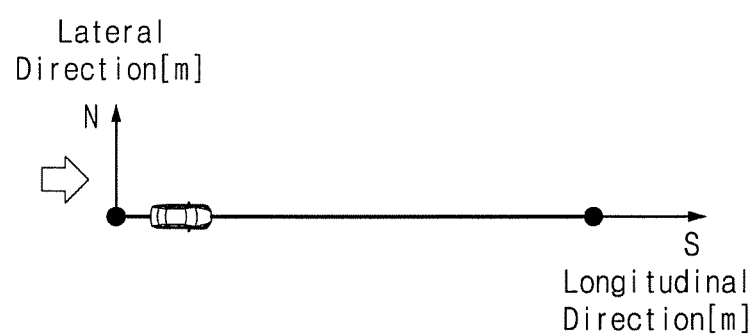
FIG. 6B is a view illustrating converting the Cartesian coordinate system of FIG. 6A into a road model coordinate system according to an exemplary embodiment of the present disclosure.
Figure 7:
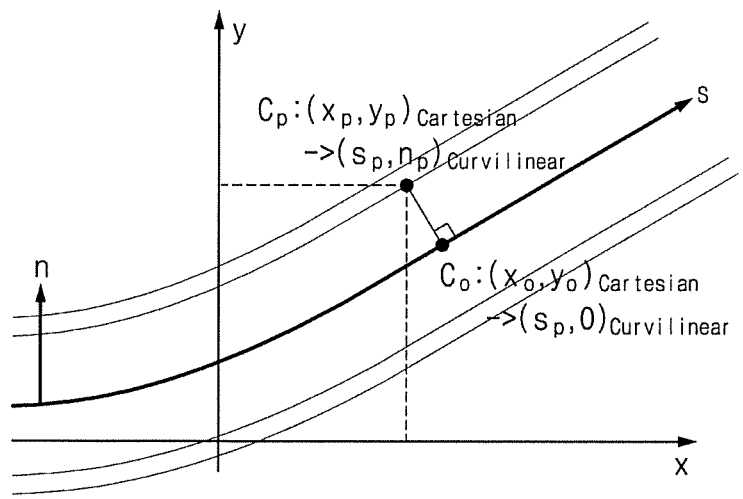
FIG. 7 is a view illustrating a road model coordinates system according to an exemplary embodiment of the present disclosure.
Figure 8A:
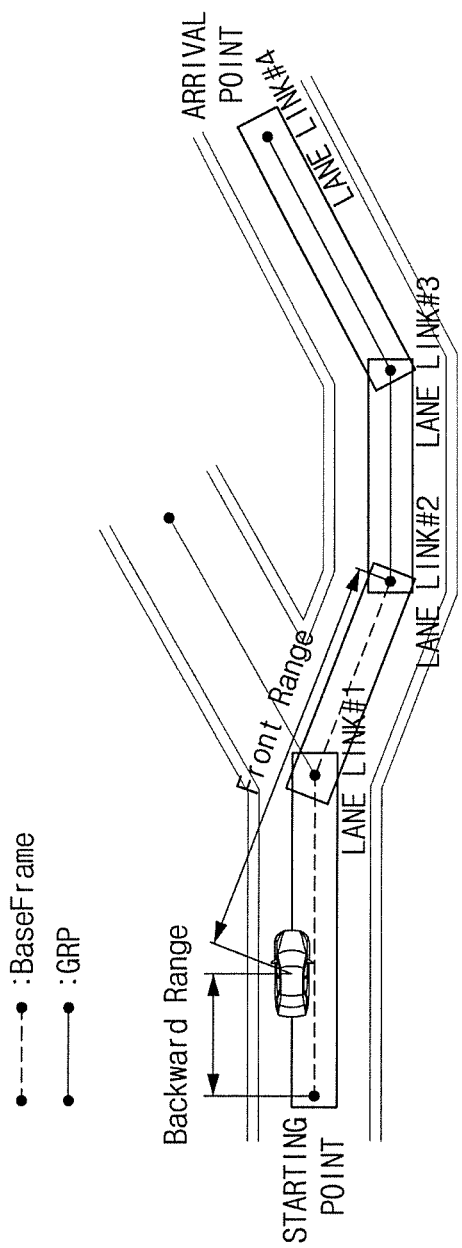
FIG. 8A is a view illustrating continuous generation of a road model according to an exemplary embodiment of the present disclosure.
Figure 8B:
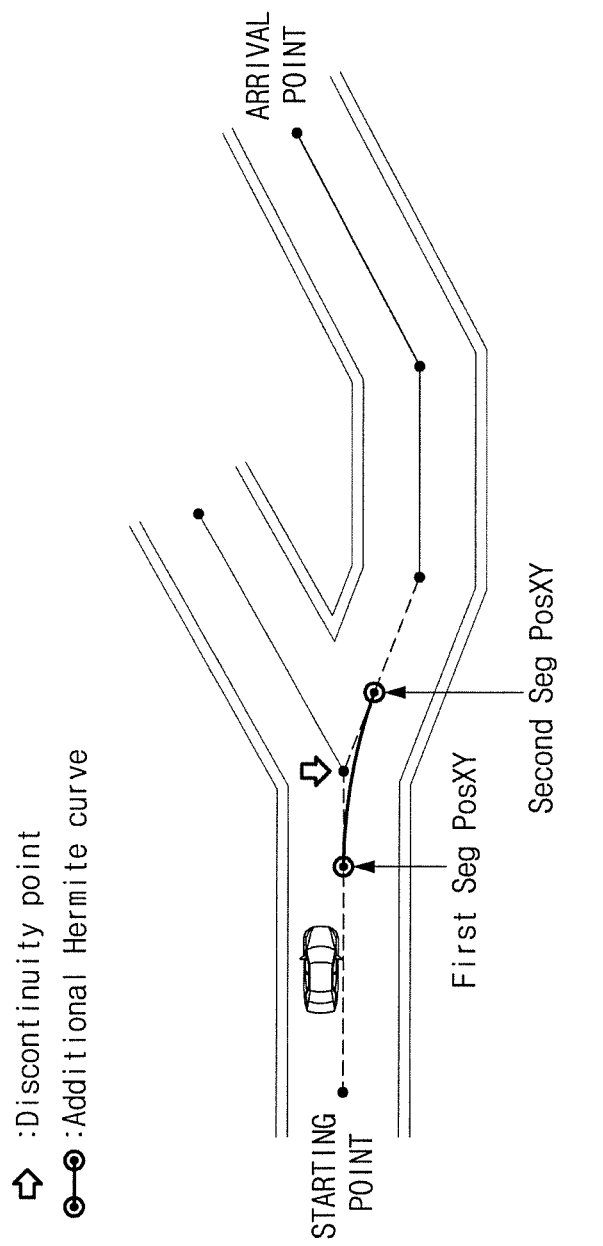
FIG. 8B is a view illustrating smooth generation of the road model of FIG. 8A.
Figure 9A:
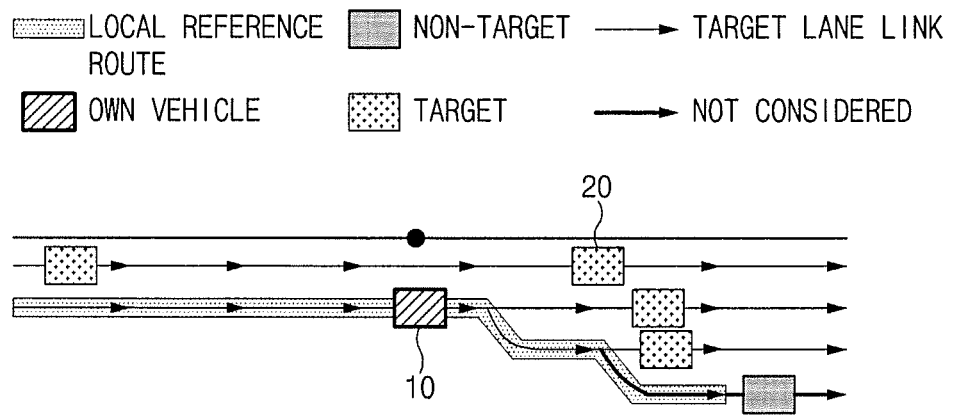
FIG. 9A is a view illustrating a driving route, displayed by a vehicle device, in which neighboring vehicles are indicated on the basis of a road model including a local reference route according to an exemplary embodiment of the present disclosure.
Figure 9B:
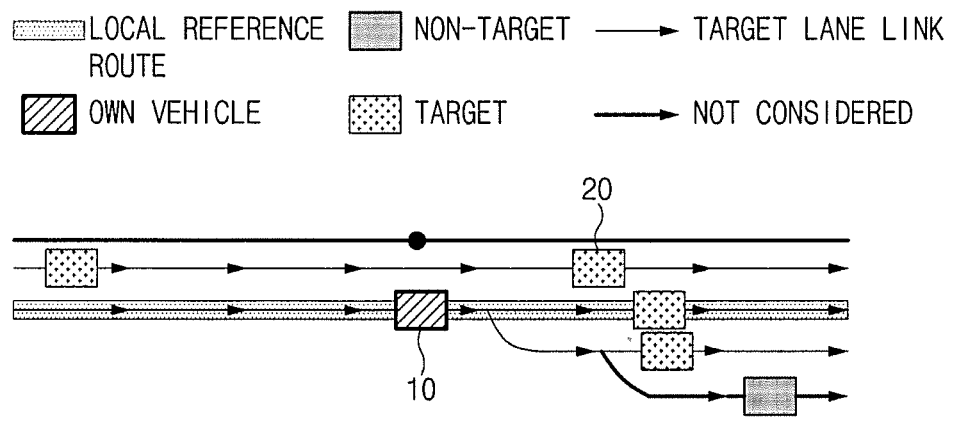
FIG. 9B is a view illustrating a driving route, displayed by a vehicle device, in which neighboring vehicles are indicated on the basis of a road model including local reference coordinates information according to an exemplary embodiment of the present disclosure.
Figure 9C:
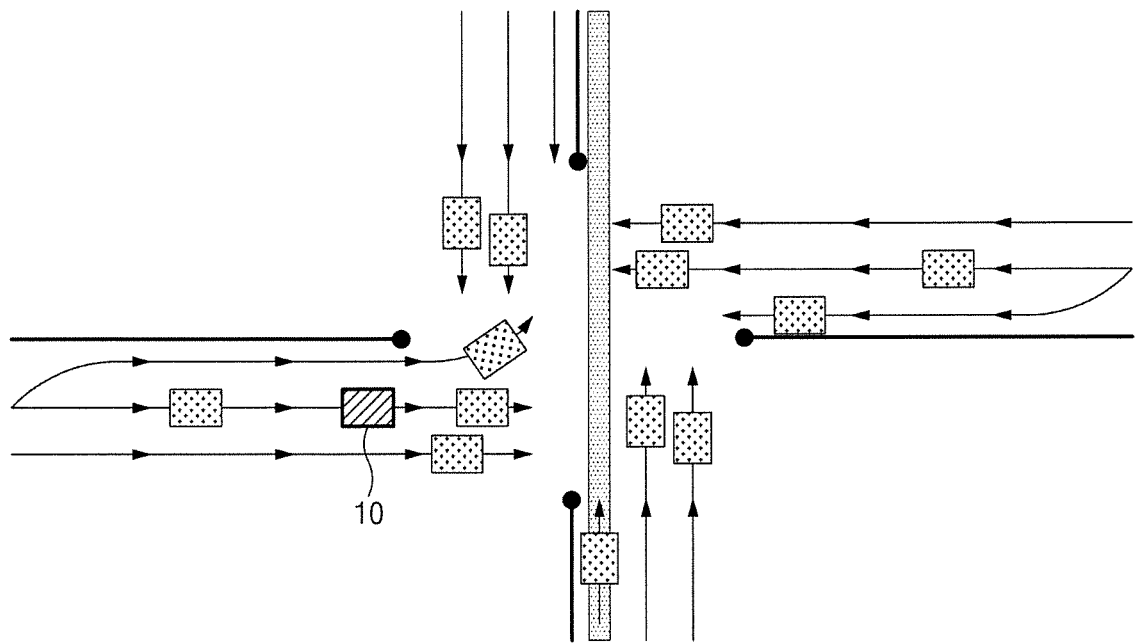
FIG. 9C is a view illustrating a driving route, displayed by a vehicle device, in which neighboring vehicles are indicated on the basis of a road model at a crossroad according to an exemplary embodiment of the present disclosure.
Figure 9D:
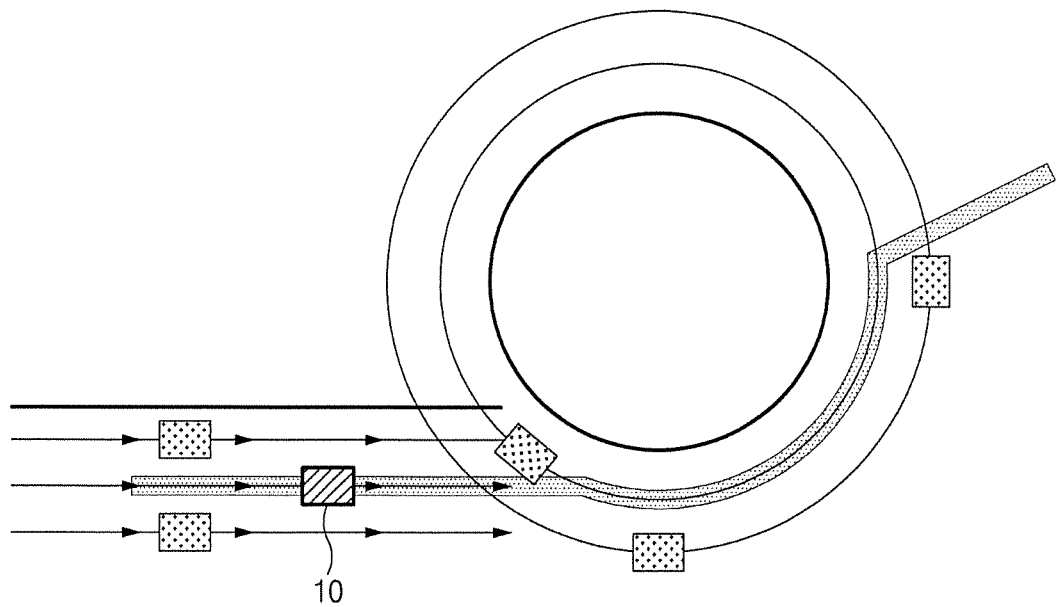
FIG. 9D is a view illustrating a driving route, displayed by a vehicle device, in which neighboring vehicles are indicated on the basis of a road model at a rotary according to an exemplary embodiment of the present disclosure.

FIG. 1 is a block diagram of a system for providing map information for determining a driving situation of a vehicle according to an exemplary embodiment of the present disclosure. FIG. 2 is a view illustrating a road shape of a detailed map according to an exemplary embodiment of the present disclosure. FIG. 3 is a view illustrating that a position of an own vehicle is mapped to a road shape of the detailed map of FIG. 2. FIG. 4 is a view illustrating that a link effective region on the basis of a position of an own vehicle is selected and displayed according to an exemplary embodiment of the present disclosure. FIG. 5A is a view illustrating a road model generated according to a requested type of a vehicle device according to an exemplary embodiment of the present disclosure. FIG. 5B is a view illustrating a road model representing a coordinates system of an own vehicle driving road according to a requested type of a vehicle device according to another exemplary embodiment of the present disclosure. FIG. 5C is a view illustrating a road model representing a coordinates system of a driving route of a target vehicle according to a requested type of a vehicle device according to an exemplary embodiment of the present disclosure. FIG. 5D is a view illustrating a road model representing a coordinates system when a vehicle takes the rotary according to a requested type of a vehicle device according to an exemplary embodiment of the present disclosure. FIG. 6A is a view illustrating the Cartesian coordinates system according to an exemplary embodiment of the present disclosure. FIG. 6B is a view illustrating converting the Cartesian coordinate system of FIG. 6A into a road model coordinate system according to an exemplary embodiment of the present disclosure. FIG. 7 is a view illustrating a road model coordinates system according to an exemplary embodiment of the present disclosure. FIG. 8A is a view illustrating continuous generation of a road model according to an exemplary embodiment of the present disclosure. FIG. 8B is a view illustrating smooth generation of the road model of FIG. 8A. FIG. 9A is a view illustrating a driving route, displayed by a vehicle device, in which neighboring vehicles are indicated on the basis of a road model including a local reference route according to an exemplary embodiment of the present disclosure. FIG. 9B is a view illustrating a driving route, displayed by a vehicle device, in which neighboring vehicles are indicated on the basis of a road model including local reference coordinates information according to an exemplary embodiment of the present disclosure. FIG. 9C is a view illustrating a driving route, displayed by a vehicle device, in which neighboring vehicles are indicated on the basis of a road model at a crossroad according to an exemplary embodiment of the present disclosure. FIG. 9D is a view illustrating a driving route, displayed by a vehicle device, in which neighboring vehicles are indicated on the basis of a road model at a rotary according to an exemplary embodiment of the present disclosure.

Referring to FIG. 1, a system for providing map information for determining a driving situation of a vehicle according to an exemplary embodiment of the present disclosure includes a map information providing apparatus 100, a detailed map database (DB) 200, a precise location determining device 300, a sensor 400, and a vehicle device 500.

The map information providing apparatus 100 may map a position of an own vehicle to a detailed map, select an effective region around the position of the own vehicle on the basis of the position of the own vehicle, generate a road model according to a type requested by a vehicle device 500 which has requested map information within the effective region, and provide the generated road model to the vehicle device 500. The map information providing apparatus 100 may be a navigation apparatus.

To this end the map information providing apparatus 100 includes a communication device 110, a storage 120, a controller 160 and a processor 170. The processor 170 has an associated non-transitory memory storing software instructions which, when executed by the processor 170, provides the functionalities of a map position updating module 130, a map information updating module 140, and a road model generating module 150.

The communication device 110 performs communication with the vehicle device 500 of a vehicle. The communicating device 110 is a hardware device implemented with various electronic circuits to transmit and receive signals via wireless or landline connections.

The storage 120 stores raw map data, position information, a road model, valid data information for generating a road model, and the like.

The map position updating module 130 of processor 170 updates the position of the own vehicle on the detailed map including lane information. The position updating module 130 may display the position of the own vehicle on the lane link by mapping the position of the own vehicle, and receive information regarding the position of the own vehicle from the vehicle sensor 400 or the precise location determining device 300. Here, referring to FIG. 2, the detailed map includes a link 12 representing a road, a node 11 connecting links, and a lane link 13 representing a lane in which a vehicle drives. Referring to FIG. 3, a location of the own vehicle 10 may be indicated on the lane link of the detailed map. Here, a node may express a crossroad, include rotation and passage code information, and include a position value of a node, attributes related to a node (crossword, road type, etc.). A link, a road not considering a carriageway, may not have directionality and include position values of starting and ending points of a link, link-related attributes (the number of lands, other link connection information, etc.). The lane link refers to each carriageway in which a vehicle drives, having directionality. In this manner, the map position updating module 130 checks a link in which a vehicle is currently positioned and a lane link and maps the link and the lane link to the detailed map.

In order to update the position of the own vehicle on the detailed map, the map position updating module 130 may generate a candidate list from boundary information of a lane link, calculate an expectation value through a given cost function with respect to lane links on the candidate list, and map a current position of the vehicle to the detailed map through the expectation value. Here, the cost function Ci may be comprehensively determined by several factors as expressed by Equation 1 below.

$$C_i = N \cdot (W_{lat.offset} \cdot W_{heading.diff} \cdot W_{prob.lane\_change} \cdot W_{road\_connectivity} \cdot W_{prev.lane})$$ [Equation 1]

Here, N denotes a normalization coefficient, $W_{lat.offset}$ denotes a lateral offset, $W_{heading.diff}$ denotes a heading difference, $W_{prob.lane\_change}$ denotes a probability of lane change), $W_{road\_connectivity}$ denotes a road Network, and $W_{prev.lane}$ denotes a previous lane link.

The map information updating module 140 of processor 170 may configure a valid detailed map by selecting an effective region around the position of the own vehicle on the basis of the position of the own vehicle on the detailed map. Here, if the entire map data is transmitted to the vehicle device 500, a load may be increased, and thus, the map information updating module 140 selects an effective region (specific region) on the basis of the position of the own vehicle at every transmission period.

The map information updating module 140 may select a region within a predetermined distance or within a predetermined number of links based on the position of the own vehicle, as an effective region.

The map information updating module 140 may select an effective region on the basis of the number or distance of higher links positioned in front of the own vehicle, the number or distance of lower links positioned behind the own vehicle, or the number or distance of sub-links at a point where links meet. Referring to FIG. 4, the effective region is selected by determining a maximum number or distance ($N_{max.forward}$) of links valid forwards on the basis of the position of the own vehicle, a maximum number or distance ($N_{max.behind}$) of links valid behind the own vehicle, and a maximum number or distance ($N_{max.depth}$) of links valid at a sub-path (Stub) of a point where links meet. Here, a maximum value of the references for selecting the effective region may be varied according to a driving condition of the vehicle or the vehicle device 500.

The road model generating module 150 of processor 170 generates a road model according to a requested type of the vehicle device 500 which has requested providing of map information.

The road model generating module 150 may generate a lane link of a road on which the own vehicle drives within a predetermined distance or within a predetermined number of links on the basis of the position of the own vehicle and generate a road model in which the position of the own vehicle on the lane link in which the own vehicle is positioned and a local reference route indicating a driving route of the own vehicle is displayed. Referring to FIG. 5A, the road model generating module 150 generates a map by collecting lane links of the route in which the own vehicle 10 drives and generating a local reference route as a reference. Here, the road model generating module 150 may know information of the route to a destination upon receiving destination information from the vehicle device 500 or upon directly receiving the destination information from the user, and in FIG. 5A, a route in which the own vehicle 10 drives to the destination is generated.

The road model generating module 150 may generate a road model by generating a lane link of a road on which the own vehicle 10 drives within a predetermined distance or within a predetermined number of links on the basis of the position of the own vehicle 10, and generating a road model coordinates system for determining a neighboring vehicle on the basis of the lane link in which the own vehicle 10 is positioned. Referring to FIG. 5B, a coordinates system for determining a neighboring vehicle on the basis of a carriageway in which the own vehicle 10 is moving. That is, a vehicle near the carriageway in which the own vehicle 10 is currently driving may be determined by generating a coordinates system of a driving route in which the own vehicle 10 is currently driving, rather than a driving route of the own vehicle 10 to the destination. In FIG. 5C, a position of the own vehicle 10 and a driving route of the own vehicle at a crossroad are generated, and in FIG. 5D, a position of the own vehicle 10 and a driving route of the own vehicle 10 at a rotary are generated. FIG. 6A illustrates a Cartesian coordinates system expressed as a road model coordinates system. FIG. 6B is a view illustrating converting the Cartesian coordinate system of FIG. 6A into a road model coordinate system according to an exemplary embodiment of the present disclosure. That is, when a road is expressed by the Cartesian coordinates system, it is expressed by a winding road (or a curved road), while when the road is expressed by a road model coordinates system in a longitudinal direction and a transverse direction, the road may be expressed by a straight line. FIG. 7 illustrates a road model coordinates system according to an exemplary embodiment of the present disclosure. FIG. 8A is a view illustrating continuous generation of a road model according to an exemplary embodiment of the present disclosure and FIG. 8B is a view illustrating smooth generation of the road model of FIG. 8A.

The detailed map DB 200 may store a detailed map including road shape information configured in a plurality of lane links. Here, the detailed map includes a link indicating a road, a node connecting links, and a lane link indicating a lane in which a vehicle drives.

The precise location determining device 300 may receive a global positioning system (GPS) signal from a GPS satellite and provide the received GPS signal to the map information providing apparatus 100.

The sensor 400 may obtain vehicle position information such as longitude coordinate values, latitude coordinate values, and the like, of the vehicle during a process in which the vehicle drives, and obtain vehicle posture information, and the like. Also, the sensor 400 may include a sensor installed in the vehicle, such as a highway driving assist (HAD), a blind-spot collision avoidance assist (BCA), and the like.

The vehicle device 500 may request map information of a desired type from the map information providing apparatus 100, and when the map information of a desired type is received from the map information providing apparatus 100, the vehicle device 500 may perform a vehicle control and determination function using the map information. For example, the vehicle device 500 may include an autonomous driving assistant system such as an advanced driver assistance system (ADAS), a highway driving assist (HDA), a blind-spot collision avoidance assist (BCA), a lane departure warning system (LDWS), a lane keeping assist system (LKAS), blind spot detection (BSD), an advanced smart cruise control (ASCC), an autonomous emergency braking system (AFB), and the like.

In this manner, in the present disclosure, since a driving situation of a neighboring vehicle is determined using road information as well as relative speeds of the own vehicle and the neighboring vehicle and a distance to the neighboring vehicle, limitation of the related art caused as road information is not known may be overcome and a road driving situation may be accurately determined.

Also, since map information of a required type desired by each vehicle device 500 is generated and provided, a problem in which a load is applied to each vehicle device 500 due to a huge amount of data processing when each vehicle device 500 generates such map information may be solved.

Figure 10:
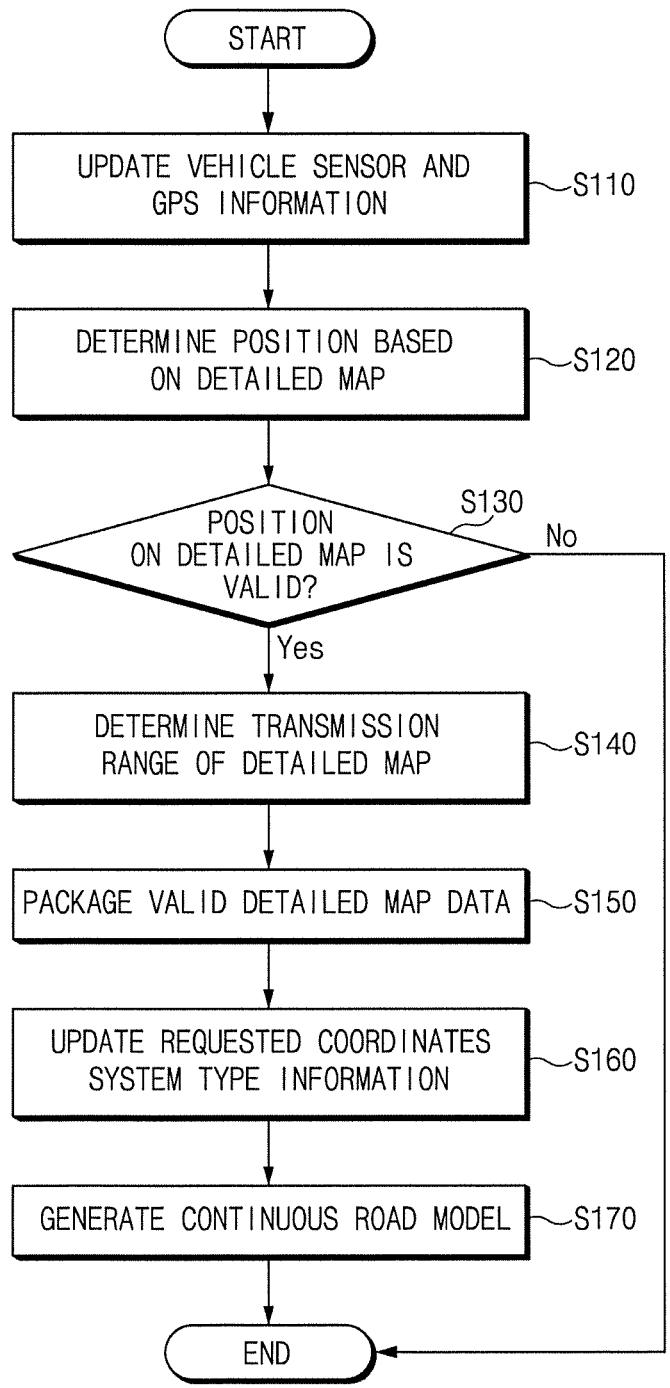
FIG. 10 is a flow chart illustrating a method for providing map information for determining a driving situation of a vehicle according to an exemplary embodiment of the present disclosure.

Hereinafter, a method for providing map information for determining a driving situation of a vehicle according to an exemplary embodiment of the present disclosure will be described with reference to FIG. 10. FIG. 10 is a flow chart illustrating a method for providing map information for determining a driving situation of a vehicle according to an exemplary embodiment of the present disclosure.

Referring to FIG. 10, the map information providing apparatus 100 updates a vehicle sensor and GPS information in operation S110 and determines a position of an own vehicle on the basis of a detailed map in operation S120. Here, a technique of mapping a position of the own vehicle on the basis of the detailed map will be described in detail with reference to FIG. 11 hereinafter.

The map information providing apparatus 100 determines whether a position of the own vehicle on the detailed map is valid in operation S130. When the position of the own vehicle on the detailed map is valid, the map information providing apparatus 100 selects a transmission range (effective region) on the detailed map in operation S140. That is, the map information providing apparatus 100 selects an effective region around the position of the own vehicle on the basis of the position of the own vehicle. In this manner, by selecting the effective region on the basis of the number or distance of higher links positioned in front of the own vehicle, the number or distance of lower links positioned behind the own vehicle, or the number or distance of sub-links at a point where links meet, only map data selected by the effective region, rather than the entire map data, may be generated. Here, the number or distance of the higher links, the number or distance of the lower links, and the number or distance of the sub-links may be previously set or may be selected by the user.

Thereafter, the map information providing apparatus 100 packages valid detailed map data within the effective region in operation S150.

The map information providing apparatus 100 updates a requested type of the vehicle device 500 in operation S160 and generates a road model according to the requested type of the vehicle device 500 on the basis of the valid detailed map data in operation S170. Here, the road model may be generated to have a size within the effective region selected in operation S140. Also, a driving route of the own vehicle to a destination, a coordinates system on the current driving route of the own vehicle, a driving route in a shape (crossroad, rotary, etc.) of a road, and the like, may be featured and generated according to a request from the vehicle device 500.

Figure 11:
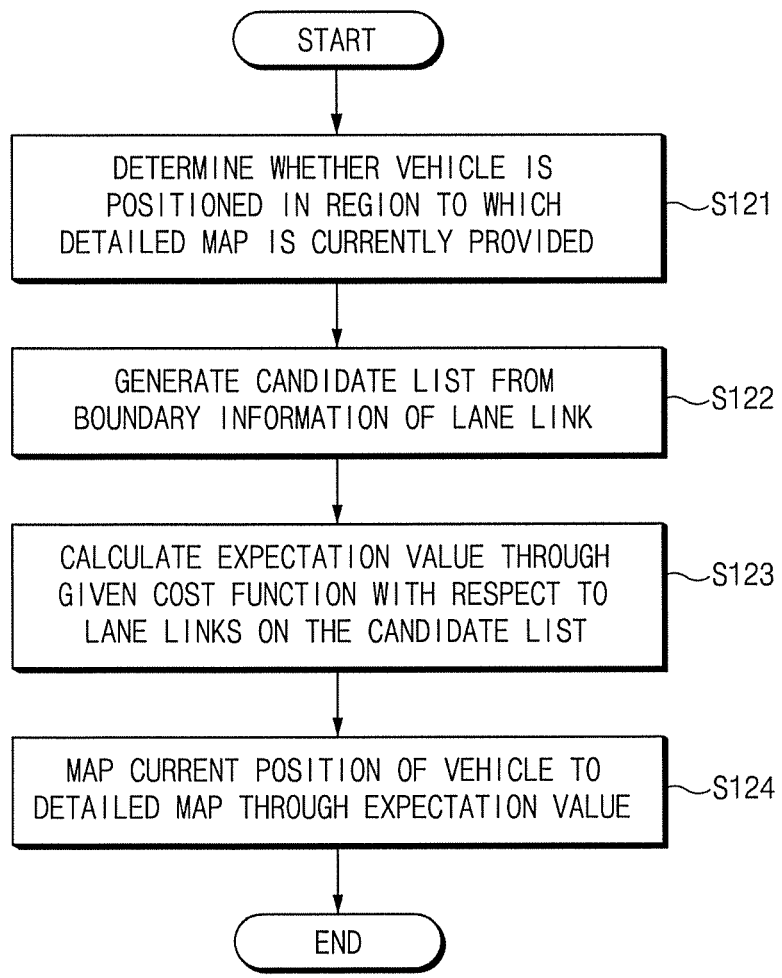
FIG. 11 is a flow chart illustrating a method for updating a position of an own vehicle to map a position of the own vehicle to map information according to an exemplary embodiment of the present disclosure.

Hereinafter, a method for updating a position of an own vehicle to map a position of the own vehicle to map information according to an exemplary embodiment of the present disclosure will be described in detail. FIG. 11 is a flow chart illustrating a method for updating a position of an own vehicle to map a position of the own vehicle to map information according to an exemplary embodiment of the present disclosure.

The map information providing apparatus 100 determines whether a vehicle is positioned in a region to which a detailed map is currently provided in operation S121.

The map information providing apparatus 100 generates a candidate list from boundary information of a lane link in operation S122, calculates an expectation value through a given cost function with respect to lane links on the candidate list in operation S123, and maps a current position of the vehicle to the detailed map through the expectation value.

However, the present disclosure is not limited to the technique of mapping the position of the own vehicle to the map disclosed in FIG. 11, and the position of the own vehicle may be mapped to the map using various general technologies.

Figure 12:
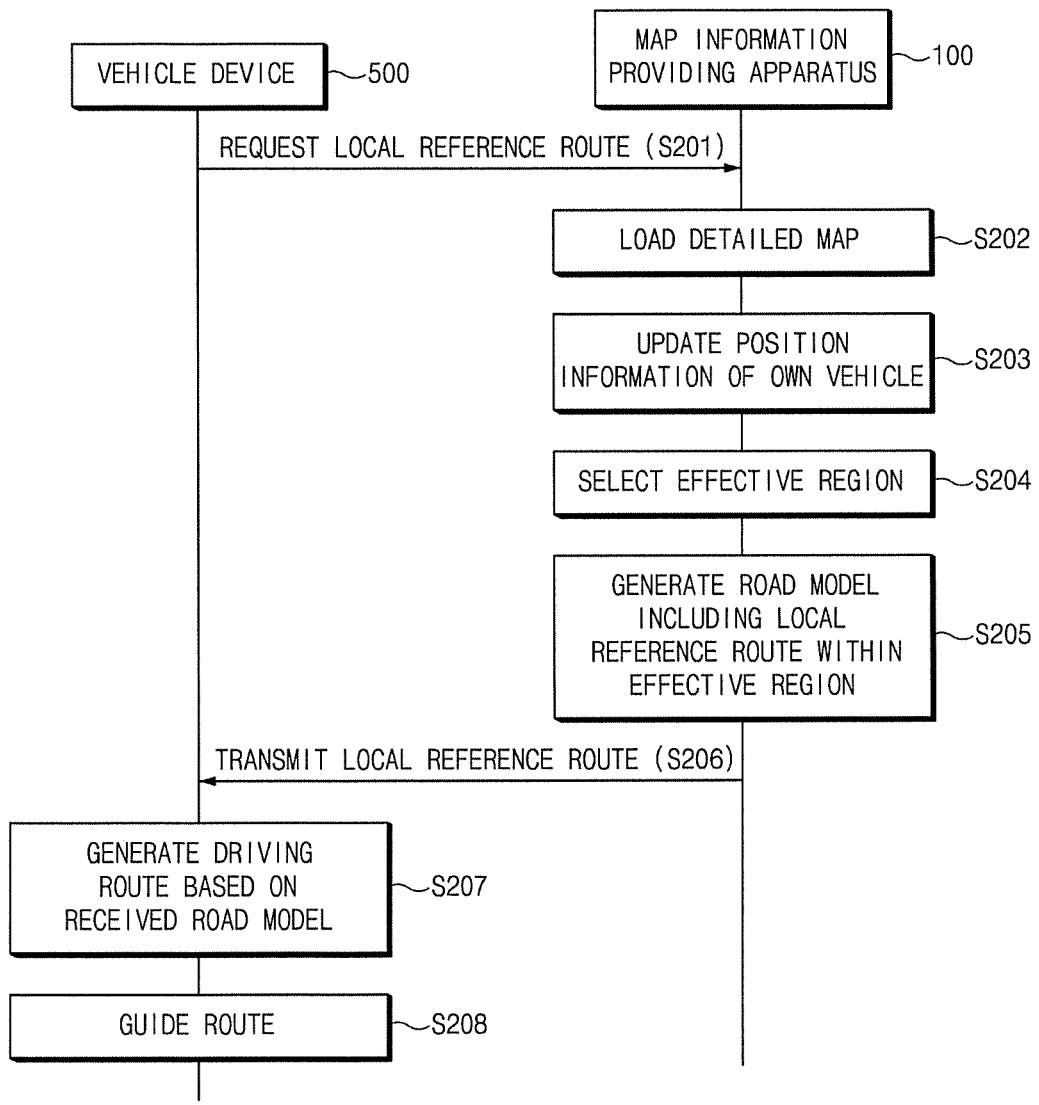
FIG. 12 is a flow chart illustrating a method for providing a driving route on the basis of a road model including a local reference route according to an exemplary embodiment of the present disclosure.

Hereinafter, a method for providing a driving route on the basis of a road model including a local reference route according to an exemplary embodiment of the present disclosure will be described in detail with reference to FIG. 12. FIG. 12 is a flow chart illustrating a method for providing a driving route on the basis of a road model including a local reference route according to an exemplary embodiment of the present disclosure. Here, the vehicle device 500 of FIG. 12 may be an ADAS.

Referring to FIG. 12, when the vehicle device 500 requests a local reference route from the map information providing apparatus 100 in operation S201, the map information providing apparatus 100 loads a detailed map from the detailed map DB 200 in operation S202 and update position information of the own vehicle on the loaded detailed map in operation S203. Thereafter, the map information providing apparatus 100 selects an effective region including at least one link in front of or behind the own vehicle in operation S204 to generate a road model including a local reference route within the effective region in operation S205. Here, the road model may be generated as illustrated in FIG. 8A or 8B.

Thereafter, the map information providing apparatus 100 transmits the generated road model including the local reference route to the vehicle device 500 which has requested the road model in operation S206.

The vehicle device 500 generates a driving route by synthesizing information regarding neighboring vehicles, or the like, on the basis of the received road model in operation S207. That is, the vehicle device 500 generates a driving route within the effective region as illustrated in FIGS. 9A and 9B by indicating positions of neighboring vehicles on the road generation model in which the position of the own vehicle is indicated.

Figure 13:
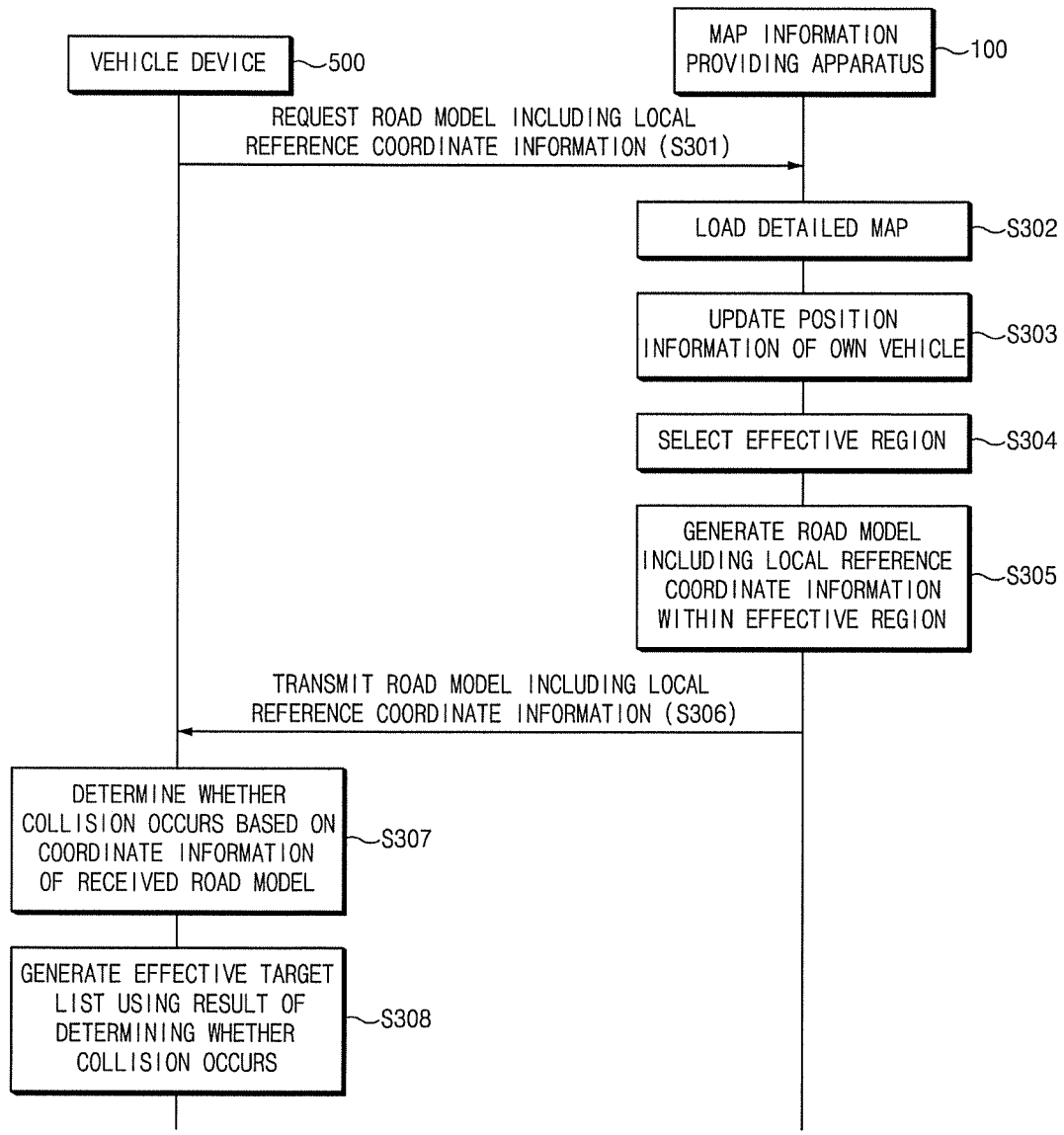
FIG. 13 is a flow chart illustrating a method for providing a vehicle service by determining whether a collision may occur on the basis of a road model including local reference coordinate information according to an exemplary embodiment of the present disclosure.

Hereinafter, a method for providing a vehicle service by determining whether a collision may occur on the basis of a road model including local reference coordinate information according to an exemplary embodiment of the present disclosure will be described with reference to FIG. 13. FIG. 13 is a flow chart illustrating a method for providing a vehicle service by determining whether a collision may occur on the basis of a road model including local reference coordinate information according to an exemplary embodiment of the present disclosure. The vehicle device 500 of FIG. 13 may be an ADAS guiding a collision avoidance route by determining whether a collision may occur.

Referring to FIG. 13, when the vehicle device 500 requests a road model including local reference coordinate information from the map information providing apparatus 100 in operation S301, the map information providing apparatus 100 loads a detailed map from the detailed map DB 200 in operation S302 and updates the position information of the own vehicle to the loaded detailed map in operation S303. Thereafter, the map information providing apparatus 100 selects an effective region including at least one link in front of or behind the own vehicle in operation S304 to generate a road model including local reference coordinate information within the effective region in operation S305. Here, the road model may be generated to include the local reference coordinate information as illustrated in FIG. 7. Here, the map information providing apparatus 100 may interwork with the precise location determining device 300, the sensor 400, and the like, to obtain the coordinate information. Here, the local reference coordinate information is coordinate information indicating a position on the road.

Thereafter, the map information providing apparatus 100 transmits the generated road model including the local reference coordinates to the vehicle device 500 which has requested the road model in operation S306.

The vehicle device 500 may determine whether the own vehicle and a neighboring vehicle will collide using the coordinate information of the position of the own vehicle and the coordinate information of the neighboring vehicle on the basis of the received road model in operation S307, and generate a valid target list using the result of determining whether the collision may occur in operation S308. Referring to FIGS. 9A and 9B, the vehicle device 500 may generate a route for avoiding a collision with the neighboring vehicles 20 in front of the own vehicle and provide the generated route.

Figure 14:
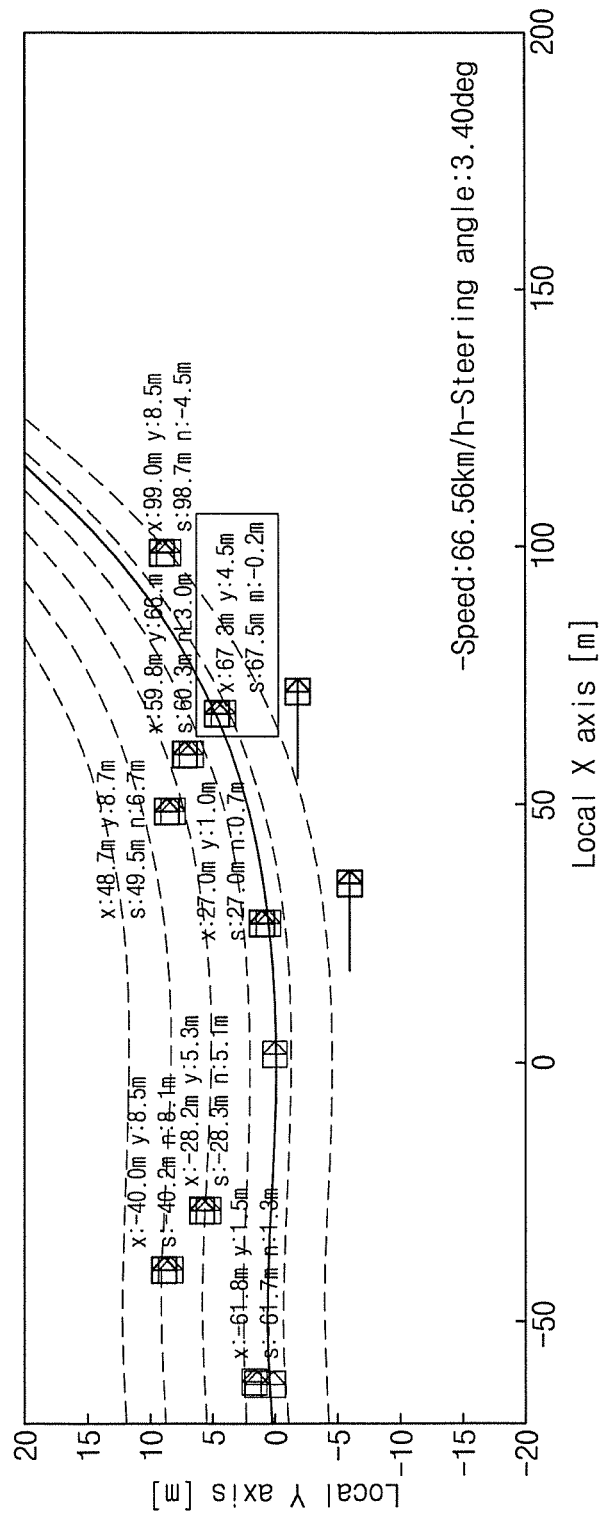
FIG. 14 is a view illustrating map information for determining a driving situation of a vehicle according to an exemplary embodiment of the present disclosure.

FIG. 14 is a view illustrating map information for determining a driving situation of a vehicle according to an exemplary embodiment of the present disclosure, and FIGS. 15A to 15D are views illustrating generation of a route for avoiding a neighboring vehicle without a collision along a continuously generated road model according to an exemplary embodiment of the present disclosure.

Figure 15D:
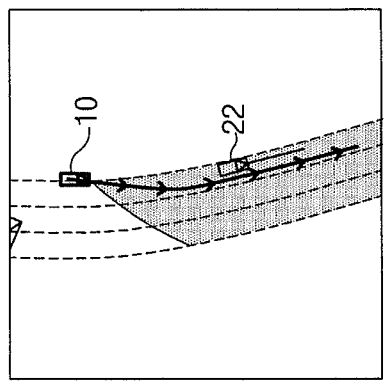
FIGS. 15A to 15D are views illustrating generation of a route for avoiding a neighboring vehicle without a collision along a continuously generated road model according to an exemplary embodiment of the present disclosure.
Figure 15C:
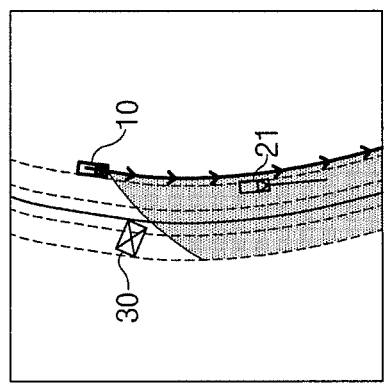
Figure 15B:
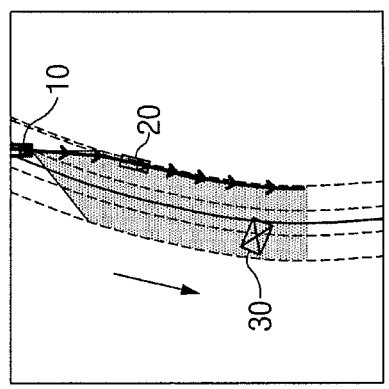
Figure 15A:
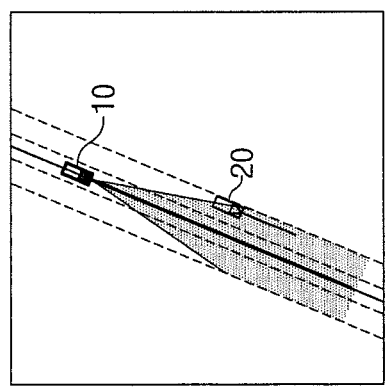

Referring to FIG. 14, when viewed from the Cartesian coordinate axes in the winding road, it may be misunderstood that, the preceding vehicle whose X axis is 67.3 meters and Y axis is 4.5 meters, is present in a lane different from that of the own vehicle, but it can be seen that, in the road model coordinates system, s axis is 67.5 meters and n axis is 0.2 meters, so the preceding vehicle is present in the same lane as that of the own vehicle. Referring to FIGS. 15A to 15D, a collision avoidance route is generated using the coordinates system of driving route of the own vehicle in the curved road. In FIG. 15A, a route is generated to avoid a neighboring vehicle 20 which is in the direction in which the own vehicle drives. FIG. 15B illustrates a route generated to avoid an obstacle 30 but having a possibility of a collision with the neighboring vehicle 20, FIG. 15C illustrates a driving route for avoiding a neighboring vehicle 21, and FIG. 15D illustrates a driving route for avoiding a neighboring vehicle 22. FIGS. 15A to 15D show an example in which a continuous driving route is divided to be displayed.

In this manner, since map information of a requested type desired by each vehicle device is generated within a valid section and only map data within a desired region, rather than the entire data, is provided to the vehicle device, there is no need to transmit a huge amount of map data, and since each vehicle device does not need to operate to generate map data, a load of each vehicle device may be minimized.

Also, since such road information is provided to each vehicle device, the vehicle devices such as an autonomous driving system, or the like, may accurately determine a road driving situation by determining a driving situation of neighboring vehicles using road information as well as relative speeds of the own vehicle and the neighboring vehicles and distances between the own vehicle and the neighboring vehicles.

Figure 16:
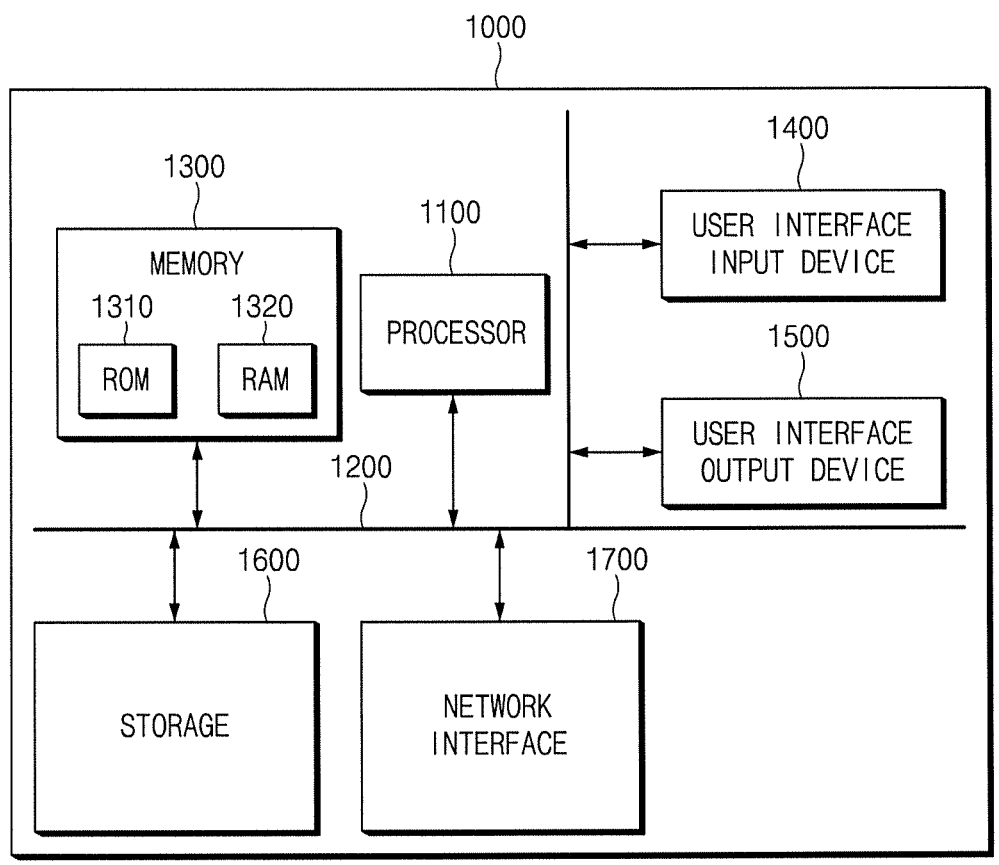
FIG. 16 is a block diagram of a computer system employing a method for providing map information for determining a driving situation of a vehicle according to an exemplary embodiment of the present disclosure.

FIG. 16 is a block diagram of a computer system employing a method for providing map information for determining a driving situation of a vehicle according to an exemplary embodiment of the present disclosure.

Referring to FIG. 16, a computing system 1000 may include at least one processor 1100, a memory 1300, a user interface input device 1400, a user interface output device 1500, a storage 1600, and a network interface 1700 connected through a bus 1200.

The processor 1100 may be a central processing unit (CPU) or a semiconductor device executing processing regarding commands stored in the memory 1300 and/or the storage 1600. The memory 1300 and the storage 1600 may include various types of volatile or non-volatile storage medium. For example, the memory 1300 may include a read-only memory (ROM) and a random access memory (RAM).

Thus, steps of a method or algorithm described in relation to the exemplary embodiments disclosed in this disclosure may be directly implemented by hardware and a software module executed by the processor 1100 or by combining two thereof. The software module may reside in a storage medium (i.e., the memory 1300 and/or the storage 1600) such as a RAM memory, a flash memory, a ROM memory, an EPROM memory, an EEPROM memory, a register, a hard disk, a detachable disk, a CD-ROM, and the like.

The illustrated storage medium may be coupled to the processor 1100, and the processor 1100 may read information from the storage medium and write information into the storage medium. In another method, the storage medium may be integrated with the processor 1100. The processor and storage medium may reside within an ASIC. The ASIC may reside within a user terminal. In another method, the processor and the storage medium may reside as separate components within a user terminal.

As described above, since map information of a specific position according to a requested type of vehicle devices is formed and provided, map information may be simply and conveniently provided by merely processing data of a required part, rather than processing a huge amount of data.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for providing map information, the apparatus comprising:
a processor configured to:
update a position of an own vehicle to a detailed map including lane information;
configure a valid detailed map by selecting an effective region around the position of the own vehicle on the basis of the position of the own vehicle on the detailed map; and
generate a road model according to a requested type of a vehicle device which has requested providing of map information, using the valid detailed map,
wherein the processor selects a region within a predetermined distance or within a predetermined number of links as the effective region, based on the position of the own vehicle, and
wherein the processor selects the effective region on the basis of the number or a distance of higher links positioned in front of the own vehicle, the number or a distance of lower links positioned behind the own vehicle, and the number or a distance of sub-links at a point where links meet, on the basis of the position of the own vehicle on the detailed map.

2. The apparatus of claim 1, wherein
the processor receives information regarding the position of the own vehicle from a vehicle sensor or a precise location determining device.

3. The apparatus of claim 2, wherein
the detailed map includes a link representing a road, a node connecting the link to another link, and a lane link representing a lane in which a vehicle drives.

4. The apparatus of claim 3, wherein
the processor maps the position of the own vehicle to the lane link to display the position of the own vehicle.

5. The apparatus of claim 1, wherein
the processor generates a lane link of a road on which the own vehicle drives, within the predetermined distance or within the predetermined number of links based on the position of the own vehicle, and generates the road model in which the position of the own vehicle is displayed on the lane link where the own vehicle is positioned and a local reference route representing a driving route of the own vehicle is displayed.

6. The apparatus of claim 1, wherein
the processor generates a lane link of a road on which the own vehicle drives, within the predetermined distance or within the predetermined number of links based on the position of the own vehicle, and generates the road model by generating a road model coordinates system for determining a neighboring vehicle on the basis of the lane link in which the own vehicle is positioned.

7. A system for providing map information, the system comprising:
a detailed map database (DB) storing a detailed map including road shape information configured in a plurality of lane links; and
a map information providing apparatus comprising a processor configured to map a position of an own vehicle to the detailed map, select an effective region around the position of the own vehicle on the basis of the position of the own vehicle, generate a road model according to a requested type of a vehicle device which has requested providing of map information within the effective region, and provide the generated road model to the vehicle device,
wherein the processor selects a region within a predetermined distance or within a predetermined number of links as the effective region, based on the position of the own vehicle, and
wherein the processor selects the effective region on the basis of the number or a distance of higher links positioned in front of the own vehicle, the number or a distance of lower links positioned behind the own vehicle, and the number or a distance of sub-links at a point where links meet, on the basis of the position of the own vehicle on the detailed map.

8. The system of claim 7, wherein the map information providing apparatus further comprises:
a communication device communicatively connected to the processor and configured to perform communication with the vehicle device.

9. The system of claim 7, wherein
the processor is further configured to:
update the position of the own vehicle to the detailed map including the lane information;
configure a valid detailed map by selecting the effective region around the position of the own vehicle on the basis of the position of the own vehicle on the detailed map; and
generate the road model according to the requested type of the vehicle device which has requested the providing of map information, using the valid detailed map.

10. The system of claim 9, wherein
the detailed map includes a link representing a road, a node connecting the link to another link, and a lane link representing a lane in which a vehicle drives, and
the processor maps the position of the own vehicle to the lane link to display the position of the own vehicle.

11. The system of claim 7, wherein
the processor generates a lane link of a road on which the own vehicle drives, within the predetermined distance or within the predetermined number of links based on the position of the own vehicle, and generates the road model in which the position of the own vehicle is displayed on the lane link where the own vehicle is positioned and a local reference route representing a driving route of the own vehicle is displayed.

12. The system of claim 7, wherein
the processor generates a lane link of a road on which the own vehicle drives, within the predetermined distance or within the predetermined number of links based on the position of the own vehicle, and generates the road model by generating a road model coordinates system for determining a neighboring vehicle on the basis of the lane link in which the own vehicle is positioned.

13. A method for providing map information, the method comprising steps of:
- updating, by a processor, a position of an own vehicle to a detailed map including lane information;
- configuring, by the processor, a valid detailed map by selecting an effective region around the position of the own vehicle on the basis of the position of the own vehicle on the detailed map; and
- generating, by the processor, a road model according to a requested type of a vehicle device which has requested providing of map information, using the valid detailed map,
- wherein, in the step of configuring a valid detailed map, a region within a predetermined distance or within a predetermined number of links is selected as the effective region, based on the position of the own vehicle, and
- wherein in the step of configuring a valid detailed map, the effective region is selected on the basis of the number or a distance of higher links positioned in front of the own vehicle, the number or a distance of lower links positioned behind the own vehicle, and the number or a distance of sub-links at a point where links meet, on the basis of the position of the own vehicle on the detailed map.

14. The method of claim 13, wherein,
in the step of generating a road model,
a lane link of a road on which the own vehicle drives is generated within a predetermined distance or within a predetermined number of links based on the position of the own vehicle, and a road model in which the position of the own vehicle is displayed on the lane link where the own vehicle is positioned and a local reference route representing a driving route of the own vehicle is displayed is generated.

15. The method of claim 13, wherein,
in the step of generating a road model,
a lane link of a road on which the own vehicle drives is generated within a predetermined distance or within a predetermined number of links based on the position of the own vehicle, and a road model is generated by generating a road model coordinates system for determining a neighboring vehicle on the basis of the lane link in which the own vehicle is positioned.

* * * * *